United States Patent [19]

Kikuchi et al.

[11] Patent Number: 5,333,124
[45] Date of Patent: Jul. 26, 1994

[54] MAGNETIC OPTICAL DISK PLAYER HAVING IMPROVED SERVORESPONSE SENSITIVITY

[75] Inventors: Ikuya Kikuchi; Ryo Sato, both of Saitama, Japan

[73] Assignee: Pioneer Electronic Corporation, Tokyo, Japan

[21] Appl. No.: 524,932

[22] Filed: May 18, 1990

[30] Foreign Application Priority Data

Sep. 22, 1989 [JP] Japan .................. 1-246900

[51] Int. Cl.$^5$ ............... G11B 13/04; G11B 11/12
[52] U.S. Cl. .................... 369/13; 360/114; 369/44.11
[58] Field of Search ............... 362/213, 215, 217, 220; 365/122; 360/114, 59; 369/13, 44.11

[56] References Cited

U.S. PATENT DOCUMENTS

| | | | |
|---|---|---|---|
| 4,504,935 | 3/1985 | Jansen | 369/220 |
| 4,660,190 | 4/1987 | Fujii et al. | 369/13 |
| 4,672,594 | 6/1987 | Kato et al. | 360/114 |
| 4,701,894 | 10/1987 | Watson | 365/122 |
| 4,750,159 | 6/1988 | Yoda | 369/13 |
| 4,763,314 | 8/1988 | McCaslin et al. | 369/215 |
| 4,802,021 | 1/1989 | Nakagawa et al. | 360/114 |
| 4,803,674 | 2/1989 | Nakao et al. | 365/122 |
| 4,939,711 | 7/1990 | Yoda | 360/114 |
| 4,959,820 | 9/1990 | Horimai et al. | 369/13 |
| 4,972,395 | 11/1990 | Baba | 369/13 |
| 4,977,549 | 12/1990 | Berg | 369/215 |
| 4,977,554 | 12/1990 | Hanagai et al. | 369/215 |

*Primary Examiner*—Eugene R. LaRoche
*Assistant Examiner*—Christopher R. Glembocki
*Attorney, Agent, or Firm*—Sughrue, Mion, Zinn, Macpeak & Seas

[57] ABSTRACT

A magnetic optical disk player comprises a turn table for turning a magnetic optical disk, a recording head and an erasing head movable along two different radial directions of the turn table respectively, and bias magnets for generating bias magnetic fields distributed along moving areas of the recording and erasing heads and having the directions opposite to each other, wherein the recording head and the erasing head each includes an objective, movable coils coupled with the objective, and drive magnet for generating a drive magnetic field interlinking the movable coils in the same direction as that of the bias magnetic fields. The directions of the bias magnetic fields for erasing and recording heads are opposite to each other. The magnetic fields for generating electromagnetic forces to drive the objective in the erasing head and the recording head are also opposite to each other. The bias magnetic field and the magnetic field for generating the electromagnetic force are additively coupled with each other in each head.

8 Claims, 2 Drawing Sheets

MAGNETIC OPTICAL DISK PLAYER HAVING IMPROVED SERVORESPONSE SENSITIVITY

RELATED CASE

This case is related to U.S. application Ser. No. 07/525,012 filed on the same date as this case, having an inventorship of KIKUCHI ET AL, being assigned to a common assignee, and entitled "MAGNETIC OPTICAL DISK PLAYER".

FIELD OF THE INVENTION

The present invention relates to a magnetic optical disk player using a so-called Kerr effect.

BACKGROUND OF THE INVENTION

Recently, a magnetic optical recording reproducing system based on the Kerr effect has been developed, and it is desired to realize its practical use.

Intensive study to realize the practical use of the magnetic optical disk player has been made. The magnetic optical disk player is different from the conventional optical disk player. In the magnetic optical disk player, a relatively strong magnet for applying a bias magnetic field extends along the moving areas of a record/reproducing head and an erasing head.

In each head, an electromagnetic force is used for driving an objective to control a focusing servo system and a tracking servo system. Accordingly, the magnetic field for generating the electromagnetic force is adversely influenced by the bias magnetic field. This results in degradation of the servo response sensitivity of the head.

SUMMARY OF THE INVENTION

An object of the present invention is to provide a magnetic optical disk player which is free from the degradation of the servo response sensitivity of the head even if the bias magnetic field exists.

To achieve the above object, a magnetic optical disk player according to the present invention comprises a turn table for turning a magnetic optical disk, a recording head and an erasing head movable along a plane including a disk support surface of the turn table in two different radial directions of the turn table respectively, and bias magnetic field generating means for generating bias magnetic fields distributed along moving areas of the recording and erasing heads and having the directions opposite to each other, wherein the recording head and the erasing head each includes an objective lens, movable coils coupled with the objective lens, and drive magnetic field generating means for generating a drive magnetic field interlinking the movable coils; and in the recording head and the erasing head, the drive magnetic field is applied to the movable coils, the drive magnetic field being in the same direction as that of the bias magnetic fields.

With such an arrangement, the directions of the bias magnetic fields for erasing and recording heads are opposite to each other. The magnetic fields for generating electromagnetic forces to drive the objective in the erasing head and the recording head are also opposite to each other. Accordingly, the bias magnetic field and the magnetic field for generating the electromagnetic force are additively coupled with each other in each head.

DETAILED DESCRIPTION OF PREFERRED EMBODIMENT

An embodiment of the present invention will be described with reference to the accompanying drawings.

Figure 1:
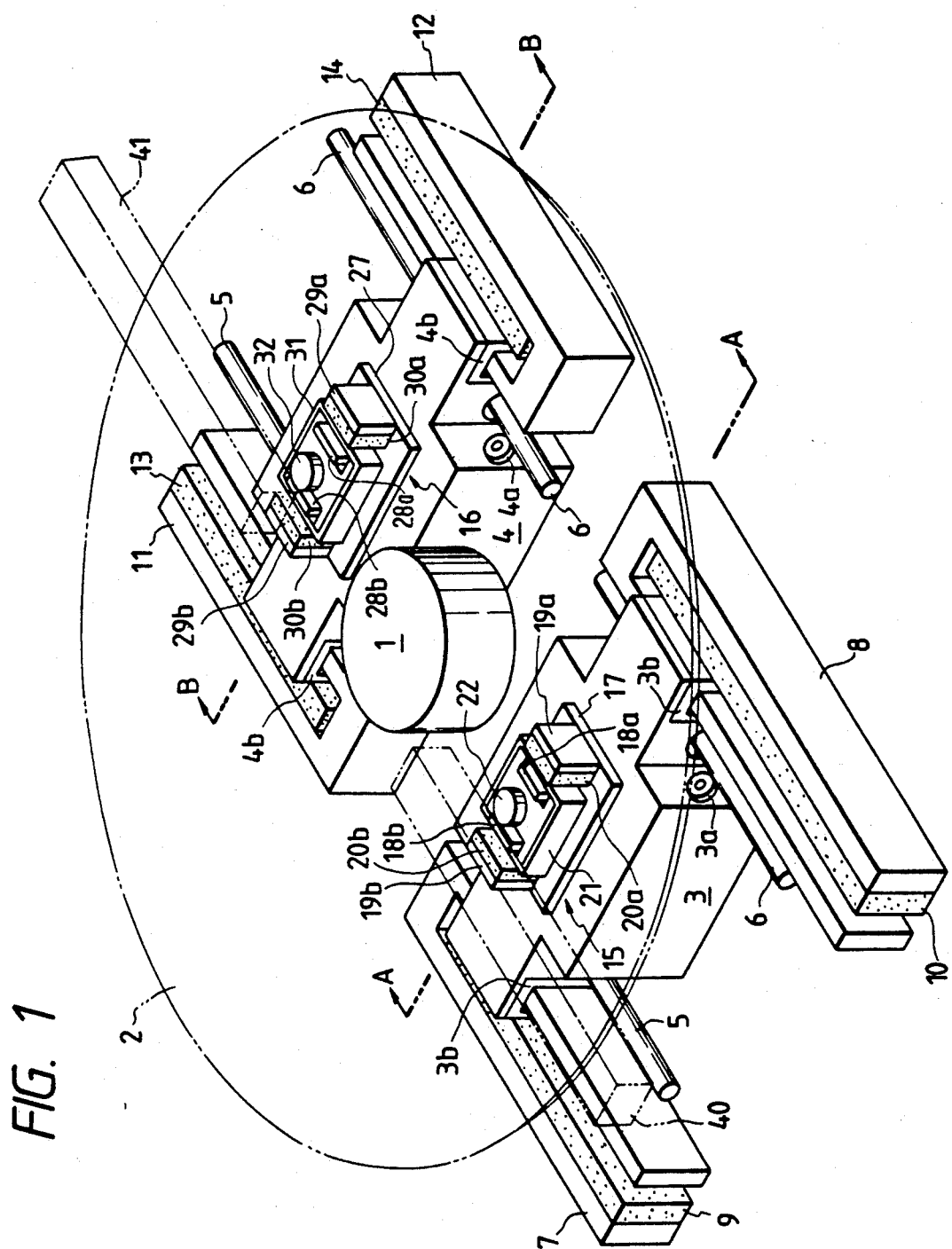
FIG. 1 is a perspective view showing a magnetic optical disk player according to the present invention.

In a magnetic optical disk player shown in FIG. 1, a turn table 1 supports the bottom of a magnetic optical disk 2, and turns the disk 2. A clamp mechanism (not shown) cooperates with the turn table 1 to fixedly clamp the magnetic optical disk to the turn table 1 for playing music. The magnetic optical disk illustrated is transparent for ease of explanation. In two different radial directions on the turn table 1, a recording head carriage 3 and an erasing head carriage 4 are movable along a plane, containing a disk carrying face of the turn table 1, with the assistance of carriage rollers 3a and 4a and parallel guide rods 5 and 6. The recording head carriage 3 and the erasing head carriage 4 are constructed with block-like members, respectively. Carriage coils 3b and 3b are respectively fastened to both end portions of the recording head carriage 3. Carriage coils 4b and 4b are respectively fastened to both end portions of the erasing head carriage 4.

The carriage coils 3b and 3b slidably cover the inner legs of U-shaped carriage yokes 7 and 8, respectively. Carriage magnets 9 and 10 are bonded to the inner walls of the outer legs of the carriage yokes 7 and 8, respectively. With such a structure, the carriage coils 3b and 3b are respectively movable crossing magnetic fluxes developed into magnetic gaps as formed by the gaps defined by the U-shaped carriage yokes 7 and 8 and with the carriage magnets 9 and 10 disposed therein. The carriage coils 4b and 4b are respectively movable crossing the magnetic fluxes developed the magnetic gaps as formed by the gaps defined by the U-shaped carriage yokes 11 and 12 with the carriage magnets 13 and 14 disposed therein. A carriage servo circuit (not shown) feeds currents to the carriage coils 3b and 3b, and 4b and 4b, in order to appropriately position the recording head carriage 3 and the erasing head carriage 4.

The recording head carriage 3 and the erasing head carriage 4 carry a recording head 15 and an erasing head 16, respectively. The structures of recording head 15 and the erasing head 16 will be described in detail. The recording head 15 follows first. In the recording head 15, two sets of inner and outer yokes 18a and 19a, and 18b and 19b are provided on a yoke bottom plate 17. Actuator magnets 20a and 20b are respectively fastened to the inner walls of the outer yokes 19a and 19b, thereby to form two magnetic gaps defined between the inner and outer yokes, respectively. The faces of the actuator magnets 20a and 20b, which abut on the outer yokes 19a and 19b, serve as N poles of the magnets. Accordingly, the fluxes in the magnetic gaps are directed from the outer yokes 19a and 19b to the inner yokes 18a and 18b. A movable bobbin 21 is provided so as to be movable with respect to the yoke bottom plate 17. The inner yokes 18a and 18b are respectively placed in two holes of the movable bobbin 21, with freedom of their movement within the holes. Focusing and tracking movable coils (not shown) are fixed to the peripheral wall of the movable bobbin 21. Accordingly, these coils are movable crossing the magnetic fields developed in the magnetic gaps. An optical system containing an objective lens 22, which is installed on the movable bobbin 21, irradiate a light spot on the magnetic optical disk 2, and receives a light beam reflected from the disk.

In the erasing head 16, two sets of inner and outer yokes 28a and 28b, and 29a and 29b are provided on a yoke bottom plate 27. Actuator magnets 30a and 30b are respectively fastened at the S pole faces to the inner walls of the outer yokes 29a and 29b, thereby to form magnetic gaps between the inner and outer yokes, respectively. In the magnetic gaps, the fluxes are directed from the inner yokes 28a and 28b to the outer yokes 29a and 29b. A movable bobbin 31 is provided, which carries focusing and tracking movable coils which alter the magnetic fluxes of the magnetic gaps to thereby control movement of the bobbin. An optical system containing an objective 32 is installed on the movable bobbin 31.

The recording and erasing heads 15 and 16 are operated by controlling a light beam emitted from the optical system and processing an electrical signal derived from a photosensor which is responsive to a reflected light beam. The recording head may be used as a reproduction head.

A magnet 40 for applying a recording bias magnetic field and a magnet 41 for applying an erasing bias magnetic field are disposed in opposition to the moving areas of the recording head 15 and the erasing head 16 with respect to the magnetic optical disk 2. The side of the bias magnetic field applying magnet 40 facing the disk 2 serves as the N pole. The recording bias magnetic field passes through the disk 2 from the upper side to the lower side. The side of the bias magnetic field applying magnet 41 facing the disk 2 serves as the S pole. The recording bias magnetic field passes through the disk 2 from the lower side to the upper side.

Figure 2A:
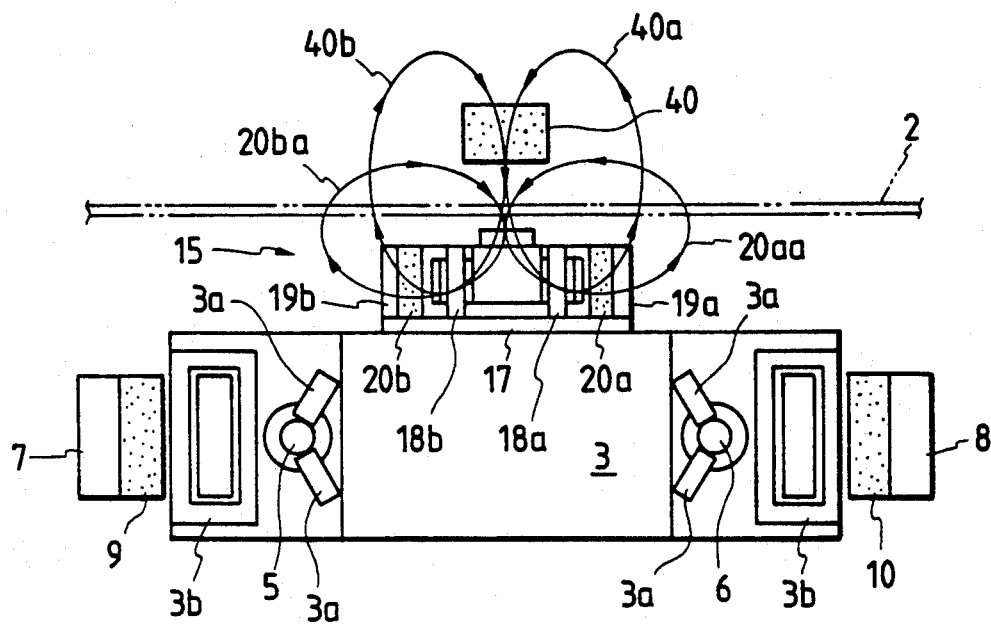
FIG. 2A is sectional view taken on line A—A in FIG. 1.

Distributions of the magnetic fluxes developed in the magnetic optical disk player thus arranged will be described with reference to FIGS. 2A and 2B. As shown in FIG. 2A, a magnetic flux developed by the recording bias magnetic field applying magnet 40 vertically passes the disk 2 from the upper side to the lower side directly under the magnet 40, as indicated by loops 40a and 40b. Magnetic fields of the actuator magnets 20a and 20b are as indicated by loops 20aa and 20ba. The magnetic fields 40a and 40b, and 20aa and 20ba are in the same direction within the recording head 15. Accordingly, the magnetic fields by the actuator magnets 20aa and 20ba will never be cancelled out by the magnetic field by the magnet 40.

Figure 2B:
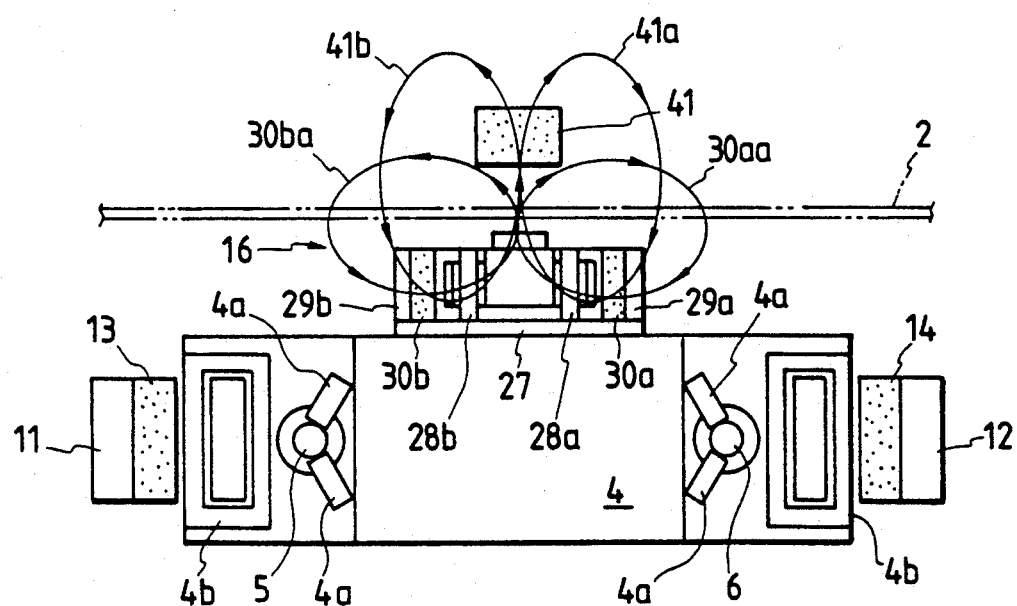
FIG. 2B is sectional view taken on line B—B in FIG. 1.

As shown in FIG. 2B, an erasing bias magnetic field by the magnet 41 passes through the disk 2 from the lower side to the upper side directly under the magnet 41, as indicated by loops 41a and 41b.

Magnetic fields developed by the actuator magnets 30a and 30b in the erasing head 16 are developed as indicated by loops 30aa and 30ba. As shown, the erasing bias magnetic fields 41a and 41b are opposite in direction to the electromagnetic force generating magnetic fields 20aa and 20ba in the recording head 15. The erasing bias magnetic field is also opposite in direction to the recording bias magnetic field. Accordingly, the magnetic fields 41a and 41b, and 30aa and 30ba are in the same direction to be additively coupled with each other. For the above reasons, the erasing head is free from the adverse effects by the erasing bias magnetic field, and rather contributes to improvement of the servo response sensitivity of the erasing head 16.

As seen from the foregoing description, in the magnetic optical disk player, the magnetic fields for generating an electromotive force to drive the servo system and the bias magnetic fields are additively coupled in the recording reproduction head or the erasing head. Therefore, the servo response sensitivity of each head is improved rather than degraded.

What is claimed is:

1. A magnetic optical disk player comprising:
   a turn table for turning a magnetic optical disk;
   recording head means and erasing head means movable along a plane including a disk support surface of said turn table in two different radial directions of said turn table; and
   bias magnetic field generating means for generating bias magnetic fields distributed along moving areas of said recording and erasing head means, said bias magnetic field generated by said recording head being in the opposite direction of said bias magnetic field generated by said erasing head,
   wherein said recording head means and said erasing head means include an objective lens, movable coils coupled with said object lens, and drive magnetic field generating means for generating a drive magnetic field applied to said movable coils to drive the position of said objective lens, said drive magnetic field of said recording head means and said erasing head means being in the same direction as that of said bias magnetic fields of said recording head means and erasing head means, respectively.

2. The magnetic optical disk player according to claim 1, wherein the bias magnetic field generating means includes two permanent magnets having magnetic pole faces, which are located on an opposite side of said moving areas of said recording and erasing heads with respect to said plane, and extend along said moving areas.

3. The magnetic optical disk player according to claim 2, wherein said drive magnetic field generating means has two magnetic gaps located symmetrically with respect to the plane orthogonal to said disk support surface, the direction of said drive magnetic field in one of said magnetic gaps is opposite to that of said drive magnetic field in the other.

4. The magnetic optical disk player according to claim 1, wherein the direction of each said drive magnetic field is orthogonal to said radial direction.

5. The magnetic optical disk player according to claim 1, wherein directions of said first and second drive magnetic field is orthogonal to said radial direction.

6. A magnetic optical disk player comprising:
   a turn table for turning a magnetic optical disk;
   recording means including recording bias magnetic field generating means for generating a recording bias magnetic field distributed along first radial direction of the disk and a first actuator movable along said first radial direction, having an objective lens, movable coil coupled with said objective lens and first drive magnetic field generating means for generating a first drive magnetic field applied to said movable coil to drive said first actuator;
   erasing means including bias magnetic field generating means for generating an erasing bias magnetic field distributed along second radial direction of the disk and a second actuator movable along said second radial direction, having objective means, movable coil coupled with said objective means and second drive magnetic field generating means for generating a second drive magnetic field applied to said movable coil to drive said second actuator;

wherein said recording bias magnetic field and said first drive magnetic field are toward a first direction, and said erasing bias magnetic field and said second drive magnetic field are toward a reverse direction from said first direction.

7. The magnetic optical disk player according to claim 6, wherein first and second bias magnetic field generating means include permanent magnets, which are located on the opposite side of moving areas of said first and second actuator with respect to the disk, and extend along said moving areas.

8. The magnetic optical disk player according to claim 7, wherein said first and second drive magnetic field generating means have two magnetic gaps located symmetrically with respect to a plane orthogonal to said disk, the direction of said drive magnetic field in one of said magnetic gaps is opposite to that of said drive magnetic field in the other.

* * * * *